Jan. 29, 1952 J. C. GRIFFIN 2,584,012
TRANSPLANTER ATTACHMENT
Filed July 21, 1949 5 Sheets-Sheet 1

JOSEPH CURTIS GRIFFIN,
INVENTOR.

BY

ATTORNEY

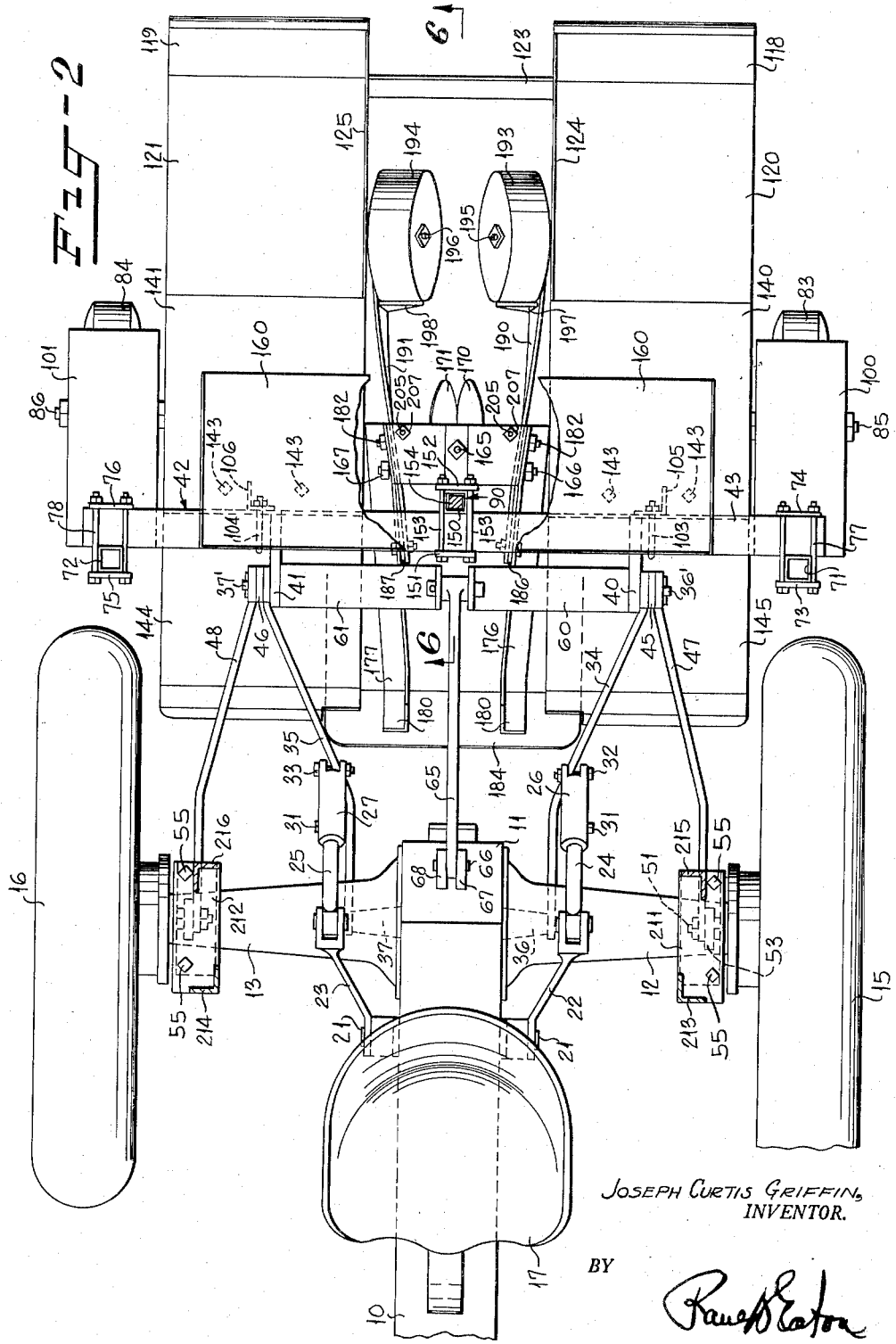

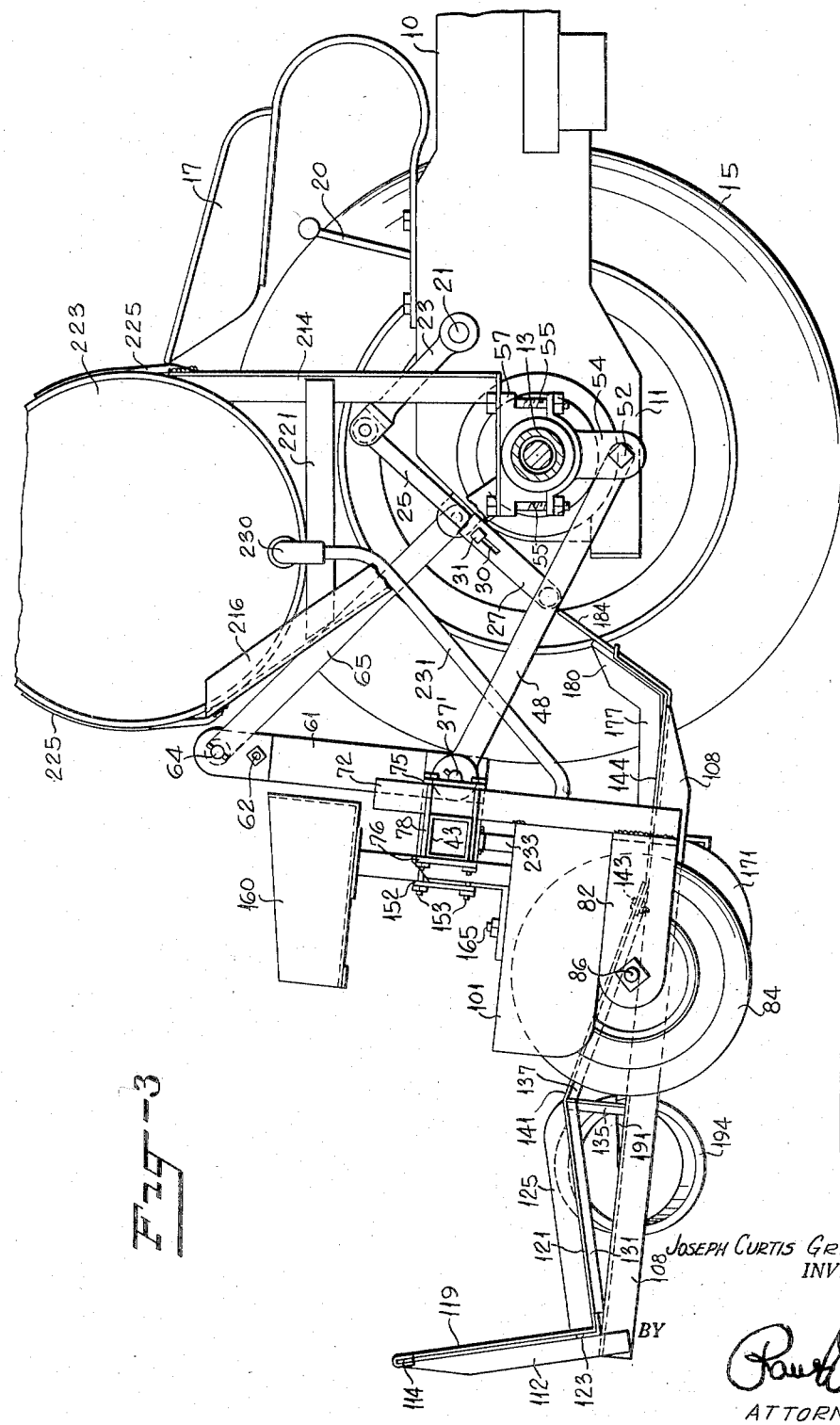

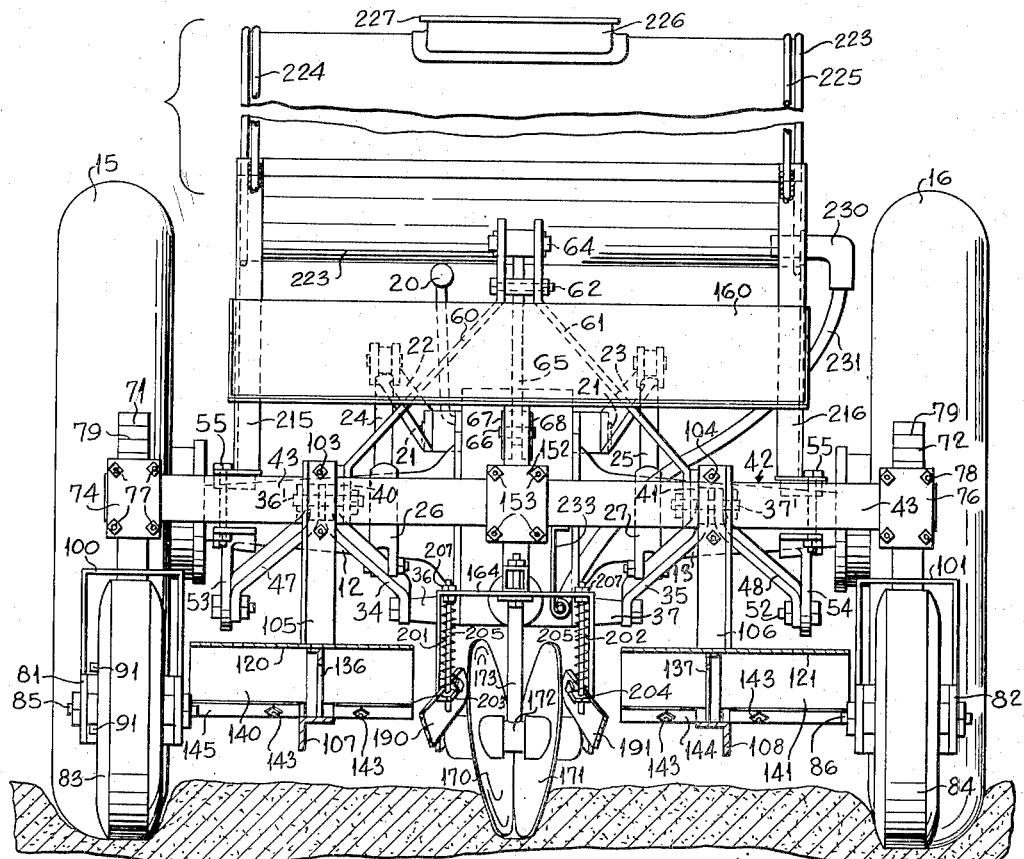

Jan. 29, 1952 J. C. GRIFFIN 2,584,012
TRANSPLANTER ATTACHMENT
Filed July 21, 1949 5 Sheets-Sheet 5

JOSEPH CURTIS GRIFFIN,
INVENTOR.

BY

ATTORNEY

Patented Jan. 29, 1952

2,584,012

UNITED STATES PATENT OFFICE 2,584,012

TRANSPLANTER ATTACHMENT

Joseph Curtis Griffin, Branford, Fla.

Application July 21, 1949, Serial No. 106,025

1 Claim. (Cl. 111—85)

This invention relates to farm implements and more especially to a transplanter adapted to be pulled over the ground by a tractor and having means for forming furrows in soft earth and having other means disposed rearwardly thereof for covering the furrow made by the first means, whereby operators may place plants between the furrow forming means and the covering means in a transplanting operation.

It is an object of this invention to make the means for forming a furrow and the means for covering the furrow in the form of a unitary attachment.

It is another object of this invention to provide means for resiliently mounting the furrow covering means so the furrow will be covered although the configuration of the earth may vary.

It is still another object of this invention to mount the furrow former on a transverse shaft and so relate the means for mounting the furrow coverer to the shaft that upon raising the furrow former to inoperative position, the shaft engages the means for mounting the furrow coverer and said coverer is also raised to inoperative position.

Figure 2 is a top plan view of Figure 1 with parts in cross-section and omitting the water reservoir and with the central portion of the plant storage shelf broken away for purposes of clarity;

Figure 3 is an elevation similar to Figure 1 but looking at the opposite side of the structure shown in Figure 1 and showing the transplanting implement in an elevated or transport position;

Figure 4 is an elevation with parts in section and omitting the scraper or land leveling plate and is taken substantially along the line 4—4 in Figure 1;

Figure 5 is an enlarged elevation of the ground wheel of the implement nearest the observer in Figure 1 and showing a form of time warning device associated therewith;

Figure 1:
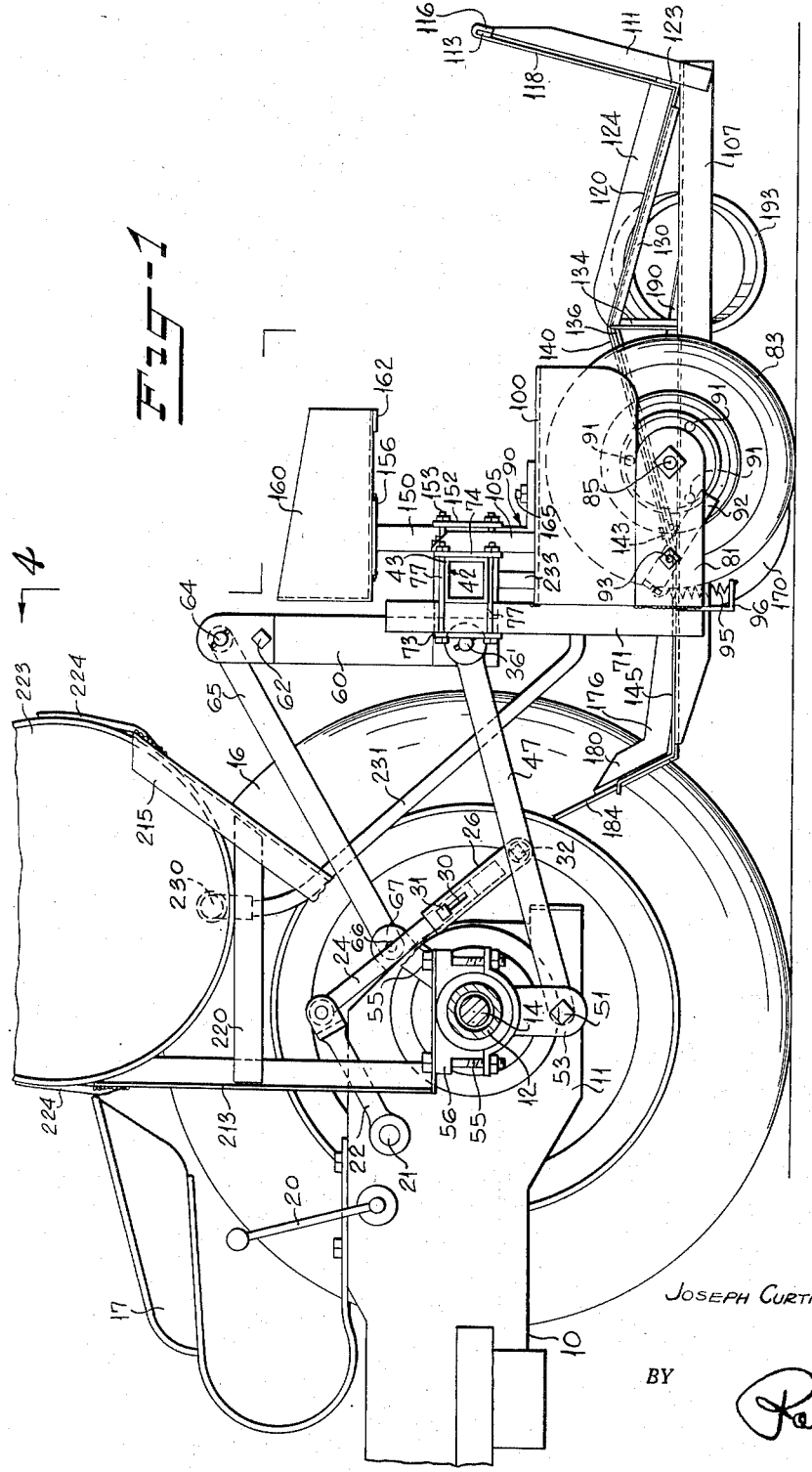
Figure 1 is a side elevation of the rear end of a tractor with the nearest wheel of the tractor removed and showing the transplanting implement in a lowered or operative position.

Referring more specifically to the drawings, the numeral 10 indicates a portion of the frame of a tractor which has a differential housing 11 at the rear end thereof from which axle housing 12 and 13 project and within which are mounted axles 14. The remote ends of the axles 14 are secured to conventional rear wheels 15 and 16. The frame 10 also supports a suitable operator's seat 17 adjacent which the upper end of a control lever 20 is disposed. The tractor is equipped with a conventional hydraulically operated shaft 21 having arms 22 and 23 secured thereto on the outer ends of which pivoted links 24 and 25 are mounted. The hydraulically operated shaft 21 is controlled by the control lever 20 to raise and lower the arms 22 and 23.

The links 24 and 25 are circular in cross-section and extend downwardly and rearwardly at an angle in Figures 1 and 3 and telescopically penetrate the upper ends of sleeves 26 and 27, respectively, each of these 26 and 27 being provided with a longitudinally extending slot 30 which is slidably penetrated by a screw 31. These screws 31 bear the weight of the transplanting implement to be later described when it is in the raised position shown in Figure 3. Telescopic relationship between the links 24, 25 and the sleeves 26, 27, respectively, is necessary in order to allow relative movement between the transplanting implement and the rear end of the tractor due to the irregular surface of the plowed ground over which the implement is adapted to travel.

The lower ends of the sleeves 26 and 27 are pivotally connected, as at 32 and 33, intermediate the ends of links 34 and 35 respectively. The links 34 and 35 extend forwardly and their front ends are pivotally connected to the remote ends of outwardly projecting portions 36 and 37 (Figure 2) integral with the differential housing 11 of the tractor 10. These links 34 and 35 extend rearwardly from the lower ends of the bars 26 and 27, in diverging relation to each other, and are pivotally mounted on stub shafts 36' and 37', respectively, projecting outwardly from the remote surfaces of horizontally disposed plates 40 and 41, respectively.

Main wheeled frame

The plates 40 and 41 are parts of a main wheeled vertically movable frame broadly designated at 42 and which also comprises a transverse tubular frame member 43 which is preferably rectangular in cross-section. The plates 40 and 41 extend rearwardly and are notched so as to straddle the frame member 43 and the straddling portions of the plates 40 and 41 are secured, as by welding, to the transverse frame member 43.

Suitable washers 45 and 46 are loosely mounted on the stub shafts 36' and 37' and serve as spacers between the rear ends of the links 34 and 35 and a pair of links 47 and 48, respectively, the rear ends of these links 47 and 48 being pivotally mounted on the stub shafts 36' and 37'. The links 47 and 48 extend forwardly in diverging relation to each other and then are bent parallel to each other and their front ends are pivotally connected as at 51 and 52 to arms 53 and 54, respectively. These arms 53 and 54 depend from the axle housings 12 and 13 and are secured as by bolts 55 to clamping members 56 and 57 integral with the axle housings 12 and 13, respectively. The upper surfaces of the arms 53 and 54 are cut away to conform to the curvature of the axle housings 12 and 13. The clamping members 56 and 57 also serve to support a reservoir tank supporting frame structure to be later described.

Welded to the proximate or inner surfaces of the horizontally disposed plates 40 and 41 are the lower ends of upwardly converging frame members 60 and 61, respectively, the upper portions of which extend in a vertical plane in spaced parallel relation to each other and are bolted together as by a bolt 62. A stub shaft 64 is fixedly mounted on the upper ends of the frame members 60 and 61 and has the rear end of a centrally located link 65 pivotally mounted thereon, the link 65 extending forwardly and downwardly and its front end being pivotally connected as at 66, to spaced portions 67 and 68 projecting rearwardly from the differential gear housing 11 of the tractor frame 10.

Opposed ends of the transverse frame member 43 of the wheeled frame 42 have vertically disposed posts 71 and 72 adjustably secured thereto by plates 73, 74 and 75, 76, respectively. The plates 73 and 75 engage the front surface of the vertically disposed posts 71 and 72 while the plates 74 and 76 engage the rear surface of the horizontally disposed transverse frame member 43 and tie bolts 77 and 78 secure the plates 73, 74, and 75, 76, respectively, together, thus clamping the vertically disposed posts 71 and 72 against the front surface of the transverse frame member 43. The vertically disposed posts 71 and 72 are preferably rectangular and tubular in cross-section and are provided with scored graduation lines 79 which are preferably spaced about one inch apart to assist an operator in determining the position of the frame member 43 relative to the posts 71 and 72 and their wheels to be presently described.

The lower portions of the posts 71 and 72 in Figures 1 and 3 are welded to rearwardly extending yoke members 81 and 82, respectively, which straddle ground wheels 83 and 84 rotatably mounted on bolts 85 and 86 carried by the yoke members 81 and 82, respectively. The ground wheels 83 and 84 support the main vertically movable frame 42 as well as a vertically adjustable frame generally designated at 90 which is mounted for vertical adjustment relative to the main frame 42 and which will be later described in detail.

*Time warning device*

It will be noted in Figure 1 that the hub of the ground wheel 83 is provided with a plurality of equally and radially spaced pins 91 which, upon rotation of the ground wheel 83, are adapted to intermittently engage the free end of a metallic sounding bar 92 which is pivotally mounted, as at 93, on the yoke member 81. The metallic bar 92 is normally urged into engagement with the pins 91 on the ground wheel 83 by a suitable tension spring 95, the upper end being connected to the bar 92 in Figure 1 and its lower end being connected to a suitable spring anchor member 96 welded to and depending from the front surface of the yoke member 81 in Figure 1.

The purpose of this metallic sounding bar 92 and the spaced pins 91 is to provide a warning device which will click each time one of the pins 91 moves out of engagement with the free end of the metallic bar 92 to thus allow the tension spring 95 to move the free end of the bar 92 against the next succeeding pin 91. This will cause a clicking sound each time one of the pins 91 is engaged by the bar 92 to thus warn the person or persons transplanting vegetation to place a plant in the furrow formed by the furrow opening disks to be later described.

Suitable fenders 100 and 101 surmount the ground wheels 83 and 84 and are also welded at their front ends to the vertically disposed posts 71 and 72, respectively.

*Seats for operators*

Secured against the rear surface of the transverse frame member 43 of the wheeled frame 42, as by U-bolts 103 and 104, are the upper ends of vertically disposed angle bars 105 and 106, respectively. The lower ends of the angle bars 105 and 106 are welded intermediate the ends of longitudinally extending angle bars 107 and 108, respectively (Figures 1, 3 and 4). These longitudinally extending angle bars 107 and 108 extend rearwardly and the lower ends of upwardly and rearwardly extending angularly disposed bars 111 and 112 are welded to the rear ends of the angle bars 107 and 108. The upper ends of the angularly disposed bars 111 and 112 are welded to transverse bars 113 and 114, respectively, which are adapted to be inserted in the lip portions 116 and 117 of the back portions 118 and 119 of sheet metal seats 120 and 121, respectively. The rear ends of the longitudinally extending angle bars 107 and 108 are also welded to an interconnecting transverse angle bar 123 which extends a substantial distance beyond opposed sides of the angle bars 107 and 108 and supports the seat plates 120 and 121 at their juncture with the back portions 118 and 119 thereof.

The proximate sides of the sheet metal seats 120 and 121 have vertically disposed sheet metal plates 124 and 125, respectively, welded thereto which are provided to prevent the occupants of the seats 120 and 121 from sliding off of the same when they are placing plants in the furrows formed by the furrow opening disks to be later described, since it is necessary for the occupants of the seats 120 and 121 to reach downwardly through the space between the proximate edges of the seats 120 and 121.

It will be noted that the seats 120 and 121 extend upwardly at an angle and suitable angle bars 130 and 131 are provided which extend forwardly and upwardly at an angle for supporting the seats 120 and 121 midway of their opposite side edges. The rear ends of the angle bars 130 and 131 are welded to the front edge of the angle bar 123 and their front ends are welded to the upper ends of vertically disposed angle bars 134 and 135.

The lower ends of the angle bars 134 and 135 are welded intermediate the ends of the longitudinally extending angle bars 107 and 108 heretofore described. Also welded to the upper ends of the angle bars 134 and 135 are the rear ends of forwardly and downwardly extending angularly disposed angle bars 136 and 137, respectively, which are provided to support leg supporting portions 140 and 141 integral with the seats 120 and 121. The front ends of the leg supporting portions 140 and 141 of the seats 120 and 121 terminate at the juncture of the vertically disposed angle bars 105 and 106 with the horizontally disposed angle bars 107 and 108 and suitable notches are provided in the front ends of these portions 140 and 141 which are loosely penetrated by the angle bars 105 and 106.

The front ends of these leg supporting portions 140 and 141 are also secured as by bolts 143 to foot supporting angle plates 144 and 145, respectively, the horizontal legs of which rest on the front portions of the longitudinally extending angle bars 107 and 108 to thus complete the structure of the main vertically movable frame 42. The seats 120 and 121 actually depend from the transverse frame member 43 by virtue of the angle bars 105 and 106 and it is thus seen that these seats may be adjusted as a unit transversely of the frame 42 if desired.

Vertically adjustable frame

Figure 6:
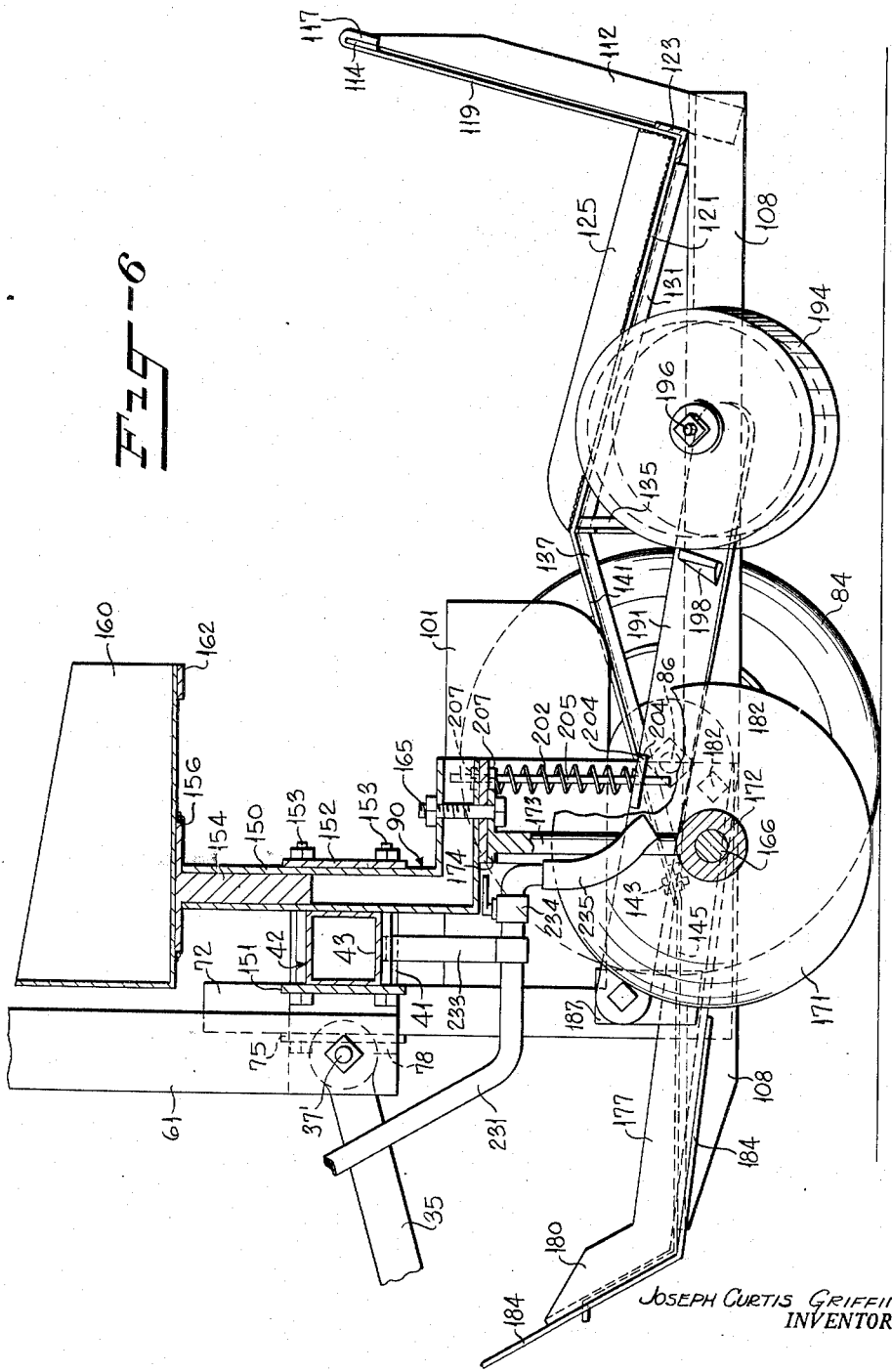
Figure 6 is an enlarged longitudinal vertical sectional view through the implement omitting the tractor and being taken substantially along the line 6—6 in Figure 2.

In Figures 4 and 6 it is most clearly shown how the vertically adjustable frame 90 is secured to the main frame 42. The vertically adjustable frame 90 comprises an L-shaped member 150 which is rectangular and tubular in cross-section and the vertical leg of which is clampingly secured to the transverse frame member 43 of the main frame 42 by plates 151 and 152 which engage the remote surfaces of the frame member 43 and the vertical leg of the L-shaped member 150, respectively, and are clamped together by suitable tie bolts 153. It is thus seen that by loosening the tie bolts 153 the L-shaped member 150 may be adjusted, either laterally or vertically relative to the transverse frame member 43 of the main frame 42 to thus adjust the position of a land leveling sled, furrow opening disks and furrow covering wheels, all to be later described, relative to the frame 42.

The vertical leg of the L-shaped member 150 extends upwardly and has a vertically disposed bar 154 slidably inserted therein, this bar 154 being rectangular in cross-section and having a horizontally disposed flange 156 at its upper end in Figure 6. This flange supports and is welded to the bottom of a tray 160, the top and rear of which is open. The bottom of the tray 160 is also reinforced adjacent its rearmost edge by a transversely extending bar 162. This tray 160 is adapted to support vegetation which may have been collected from a greenhouse or from another planted area and which is to be transplanted.

The horizontal leg of the L-shaped member 150 of the vertically adjustable frame 90 has the horizontal portion of an inverted substantially U-shaped member 164 secured thereto as by a bolt 165. The vertical legs of the inverted U-shaped member 164 are spanned at their lower ends by an axle 166 opposed ends of which are preferably restricted and slidably penetrate the vertical legs of the inverted U-shaped member 164 and are secured therein as by nuts 167 threadably mounted on the restricted ends of the shaft 166 (Figure 2). The shaft 166 has suitable closely spaced concavo-convex furrow opening disks 170 and 171 rotatably mounted thereon, the front lower portions of which are spaced very closely together and the rear upper portions of which are spaced a substantially greater distance apart from each other than the front and lower portions thereof to thus produce a wedging effect of the disks 170 and 171 as they move through the soil as the implement is pulled along by the tractor. The concave sides of the disks 170 and 171 face each other.

The disk supporting shaft 166 also slidably penetrates a hub member 172 which serves as a spacer between the disks 170 and 171 since the concave surfaces of the disks 170 and 171 face each other. The hub member 172 is welded to the lower end of a stand 173 the upper end of which has a plate portion 174 integral therewith and which is slidably penetrated by the bolt 165 to thus secure the stand 173 to the L-shaped member 150 as well as to the horizontal portion of the inverted U-shaped member 164.

Land leveling sled

The restricted ends of the shaft 166 also slidably penetrate the rear portions of substantially horizontally disposed angle bars 176 and 177, the front ends of which are turned upwardly at an angle as at 180 in Figures 1, 3 and 6. These angle bars 176 and 177 are also secured to the lower ends of the vertical legs of the inverted U-shaped member 164 by suitable bolts 182 (Figures 2 and 6). Welded to the lower surfaces of the angle bars 176 and 177, in Figure 6, is the horizontal portion of a scraper plate or land leveling sled 184, the rear edge of which terminates a substantial distance short of the rear ends of the angle bars 176 and 177. The front end of the angle plate 184 is bent upwardly to conform to the upwardly bent portions 180 of the angle bars 176 and 177 and is also welded thereto.

Furrow closing wheels

Suitable bearing blocks 186 and 187 are welded to the proximate sides of the angle bars 176 and 177 and extend upwardly therefrom and have the front ends of arms 190 and 191 pivoted thereon. These arms 190 and 191 extend rearwardly and are then bent at a slight angle reltive to the vertical and have suitable flat surfaced furrow covering wheels 193 and 194 rotatably mounted on axles 195 and 196, respectively, projecting inwardly and upwardly at an angle from the proximate surfaces of the arms 190 and 191. These arms 190 and 191 are also provided with suitable scraper blades 197 and 198 respectively which are disposed closely adjacent the front portions of the furrow covering wheels 193 and 194 to thus prevent the accumulation of earth on these wheels 193 and 194. The angular attitude of the wheels 193 and 194 tends to move the soil raised by the disks 170 and 171 back into the furrow to thus cover the roots of the plants placed therein by the operators.

The arms 190 and 191 with their wheels 193 and 194 are urged downwardly at their free ends by suitable compression springs 201 and 202, the lower ends of which bear against pressure plates 203 and 204 welded to the proximate sides of the arms 190 and 191, respectively. The upper ends of the compression springs 201 and 202 bear against the lower surface of the horizontal portion of the inverted U-shaped member 164 and suitable guide pins 205 are surrounded by each of the compression springs 201 and 202. The lower ends of the guide pins 205 slidably penetrate the pressure plates 203 and 204 (Figure 4)

and the upper ends thereof are secured to the horizontal portion of the inverted U-shaped member 154 by suitable lock nuts 207.

It is thus seen that vertical adjustment of the L-shaped member 150 relative to the transverse frame member 43 of the main frame 42 will cause like adjustment of the scraper blade or land leveling sled 184 and the furrow opening disks 170 and 171 as well as the furrow covering wheels 193 and 194 relative to the ground wheels 83 and 84 and the seats 120 and 121. This completes the description of the vertically adjustable frame 90.

It will be noted that adjustment of the ground wheels 83 and 84 relative to the transverse frame member 43 of the main frame 42 will vary the distance between the seats 120 and 121 and the ground over which the implement is adapted to be pulled by the tractor.

The wheels 15 and 16 of the tractor will, in some instances sink into soft or sandy soil to such a depth as to require that the lower portions of the ground wheels 83 and 84 be disposed in substantially the same horizontal plane as the lower portions of the disks 170 and 171, as shown in Figures 1, 3, 4 and 6, since the ground wheels 83 and 84 "track" the wheels 15 and 16 of the tractor.

It is manifest that when the implement is used on rich soil, the wheels 15 and 16 of the tractor would sink only slightly into the soil and therefore the lower portions of the disks 170 and 171 would be adjusted to a lower position relative to the ground wheels 83 and 84 by loosening the bolts 153.

Also, when the implement is used on a hillside, one of the ground wheels 83 or 84 may be adjusted to a lower elevation than the other relative to the frame member 43 so the implement may move along in a substantially horizontal position.

*Water reservoir*

Plates 211 and 212 are secured to the upper surfaces of the axle housings 12 and 13 by the bolts 55 which secure the arms 52 and 53 to the lower surfaces of the axle housings 12 and 13. The lower ends of vertically disposed angle bars 213 and 214 are welded to the front portions of the plates 211 and 212 and the lower ends of upwardly and rearwardly extending angularly disposed angle bars 215 and 216 are welded adjacent the rear edges of the plates 211 and 212. The angle bars 213, 215 and 214, 216 are spanned intermediate their ends by horizontally disposed brace bars 220 and 221, respectively, which are welded to the corresponding angle bars. The flanges of the angularly disposed angle bars 215 and 216 extend inwardly toward each other and support a reservoir tank or drum 223 and the upper ends of the angle bars 213 and 215 are cut at an angle and support the front portion of the reservoir tank 223. The tank 223 is adapted to contain a supply of water.

After the tank 223 is positioned in the manner heretofore described, suitable curved tie rods 224 and 225 are welded at their front ends to the upper ends of the angle bars 213 and 214, respectively, and are then passed over the top of the tank 223, as shown in Figure 4, and welded to the upper ends of the angle bars 215 and 216 at their rear ends. The upper portion of the tank 223 is provided with a suitably framed opening, the frame of the opening being indicated by the reference character 226 in Figure 4 and a suitable cover plate 227 rests on the upper edges of the frame 226 surrounding said opening. One end of the tank 223 is penetrated by a pipe elbow 230 which is secured to the end of the tank 223 by any suitable means such as welding and has the upper end of a flexible pipe or hose 231 adhesively connected thereto. This flexible pipe 231 extends downwardly and passes through a suitable looped strap iron member 233 (Figure 6) depending from and welded to the lower surface of the transverse frame member 43 of the main frame 42. It is necessary that this pipe 231 be flexible due to the relative movement between the tank 223 and the vertically movable frame 42.

The pipe 231 has a suitable manually operable valve 234 connected thereto and disposed within reach of the occupants of the seats 120 and 121. The valve 234 has connected to the lower end thereof a flexible pipe or hose 235. It will be observed in Figure 6 that this pipe 235 is curved rearwardly and downwardly so that upon opening the valve 234, the water will flow from the reservoir 223 through the pipe 231, by gravity, and will be discharged from the open end of the pipe 235 to a point rearwardly of the axle 166 and between the concavo-convex disks 170 and 171 thus insuring that the furrow formed in the earth by the furrow opening disks 170 and 171, as the implement is pulled along by the tractor, will have an ample supply of water for the plants which are taken from the tray 160 by the operators on the seats 120 and 121 and are placed in the furrow formed by the furrow opening disks 170 and 171 and which furrow is then filled in by the wheels 193 and 194 due to these wheels being flat and disposed at an acute angle relative to each other and relative to the vertical to thus complete the transplanting operation.

The drawings show the transplanting being carried out on a perfectly level field. Sometimes it is desired to set the plants on a ridge. Ridges or beds are first formed across the field and this elevates the rows where the plants are to be transplanted and, of course, the furrow opening disks 170 and 171 will open a furrow in the top of the ridge for the transplanting of the plants. In this event the ground wheels 83 and 84 would be adjusted downwardly or the center frame 90 would be adjusted upwardly relative to the transverse member 43 of the frame 42 to cause the furrow opened in the ridge to be at the proper depth.

In the drawings and specification there has been set forth a preferred embodiment of the invention, and although specific terms are employed, they are used in a generic and descriptive sense only, and not for purposes of limitation, the scope of the invention being defined in the claim.

I claim:

In a transplanter having a transverse frame member supported on wheels, a unitary furrow opening and closing attachment, said attachment comprising an inverted U-shaped member having legs supporting a shaft, bracket means secured to said U-shaped member for connection to said frame member to dispose said U-shaped member with the legs thereof in transverse alignment and said shaft parallel to said frame member, furrow opening means mounted on said shaft between said legs, support means secured to said legs and extending forwardly thereof, a pair of transversely spaced arms pivoted at their front ends to said support means forwardly of said legs and extending rearwardly beyond said U-shaped member, the intermediate portions of said arms being disposed within said U-shaped member between said legs and above said shaft, the rear end of each arm carrying a furrow closing wheel, and spring means between said U-shaped member and said intermediate portions of said arms to urge said arms downwardly, whereby the furrow closing wheels will resiliently engage the earth to close the furrow when the furrow opening means is in lowered operative position and the furrow closing wheels will be raised when said furrow opening means is raised and said shaft engages said arms.

JOSEPH CURTIS GRIFFIN.

REFERENCES CITED

The following references are of record in the file of this patent:

UNITED STATES PATENTS

| Number | Name | Date |
|---|---|---|
| 467,428 | Nagley | Jan. 19, 1892 |
| 495,304 | Clow | Apr. 11, 1893 |
| 523,800 | Unger | July 31, 1894 |
| 808,000 | Brennan | Dec. 19, 1905 |
| 1,073,702 | Owens | Sept. 23, 1913 |
| 1,171,263 | Seymour | Feb. 8, 1916 |
| 1,363,176 | Church | Dec. 21, 1920 |
| 1,654,861 | Cerati | Jan. 3, 1928 |
| 1,693,318 | Shell | Nov. 27, 1928 |
| 1,807,474 | England | May 26, 1931 |
| 2,334,598 | Bateman et al. | Nov. 16, 1943 |
| 2,351,078 | Silver | June 13, 1944 |
| 2,426,529 | Silver | Aug. 26, 1947 |
| 2,463,925 | Vetter | Mar. 8, 1949 |
| 2,468,483 | Chambers et al. | Apr. 26, 1949 |
| 2,475,078 | Cherry | July 5, 1949 |
| 2,492,573 | Hearron | Dec. 27, 1949 |

FOREIGN PATENTS

| Number | Country | Date |
|---|---|---|
| 581,912 | Germany | Aug. 4, 1933 |